July 31, 1945.  D. F. WINTERINGHAM  2,380,714

EJECTOR

Filed June 29, 1944

INVENTOR
DAVID FREDERICK WINTERINGHAM

Ernest E Carver
ATTORNEY

Patented July 31, 1945

2,380,714

UNITED STATES PATENT OFFICE 2,380,714

EJECTOR

David Frederick Winteringham, Vancouver, British Columbia, Canada, assignor to Alfred W. Carter, Vancouver, British Columbia, Canada Application June 29, 1944, Serial No. 542,742

3 Claims. (Cl. 103—272)

My invention relates to improvements in ejectors of the annular propellant jet type. In ejectors of this type difficulty has been encountered in assuring that two or more ejectors of a given size and pattern, operated under identical conditions, should give substantially equal results. One of the causes of this defect has been that the propellant fluid passing through the chamber prior to entering the annular jet would eddy and at times take on a circular motion in one direction around the sleeve of the jet, so that the flow through the jet itself would be irregular, at times flowing in the form of a spiral of irregular pitch and setting up a centrifugal action which resulted in serious deficiency in the volume delivered by the ejector.

The objects of the present invention are to provide means within the propellant chamber surrounding the jet for causing the propellant fluid to discharge through the jet at a speed which is constant at all parts of the circumference of the jet. Another object is to provide means whereby the ejector can be adjusted to changed operating conditions without dismantling or removal from the pipe line in which it may be installed.

Referring to the drawing.

In the drawing like characters of reference indicate corresponding parts in each figure.

Figure 1:
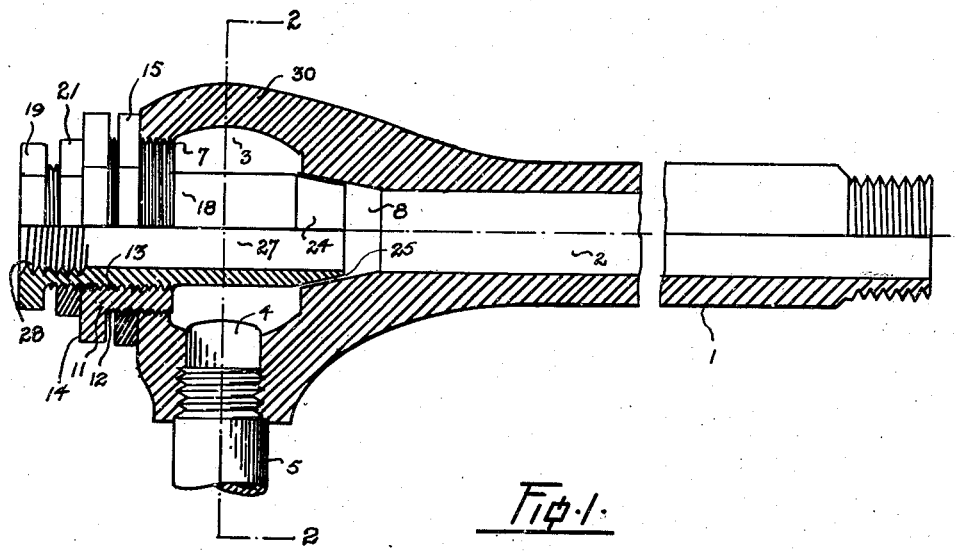
Figure 1 is a longitudinal sectional view of the invention.
Figure 2:
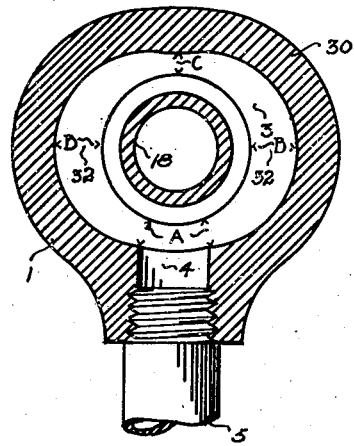
Figure 2 is a transverse sectional view taken on the line 2—2 of Figure 1.

The numeral 1 indicates generally the body of the ejector having an axial bore 2 in which is formed a propellant fluid chamber 3 having an inlet 4 in its peripheral wall which is adapted for connection to a pipe 5. The rear of the chamber 3 is provided with a threaded opening 7 which is concentric with the bore 2 and at the rear of the bore within the chamber is a conical recess 8.

A sleeve 11 having a quick pitch external thread 12 on its outer periphery and a slow pitch thread 13 on its inner periphery is fitted into the threaded opening 7. This sleeve 11 is provided with an integral nut 14 by which it is adjusted and a lock nut 15 by which it is locked in adjusted position against the rear end of the body 1.

Fitted within the sleeve 11 is an inner sleeve 18 having a nut 19 at its rear end and a threaded portion extending forwardly therefrom which engages the slow pitch thread 13 of the sleeve 11. A lock nut 21 is provided to lock the sleeve 18 in adjusted position within the sleeve 11. At the inner end of the inner sleeve 18 a cone 24 is formed which projects into the conical recess 8 to form therewith an annular jet 25 through which the propellant fluid from the inlet pipe 5 enters the bore 2. The inner sleeve 18 is provided with a bore 27 coinciding with that of the bore 2. A thread 28 is formed at the rear end of the inner sleeve 18 which is adapted to connect said sleeve to a suction pipe, not shown.

The peripheral wall 30 of the chamber 3 is irregularly spaced from the periphery of the inner sleeve 18, consequently forms a pair of passages 32 of equal length, each extending circumferentially of the inner sleeve from the propellant fluid inlet 4 to the top of the body where these passages meet. From the line A on opposite sides of the inlet to the opposing points B which are perpendicular to the inlet, the width of both passages increase and from these points to the point C which is directly in line with the inlet, the width of the passages decrease materially. In view of the convergence of the walls of the passages between the points B and the point C the fluid flow, circumferentially of the inner sleeve 18, is checked to such an extent that fluid flowing around one side of the chamber will not flow past the point C and cause eddy currents which will in any way affect the even flow of fluid passing through the annular jet 25. The equalization of flow velocity around the entire jet insures an even and constant delivery through the bore 2.

When the device is connected up, it can be adjusted to obtain optimum efficiency by slackening off the lock nuts 15 and 21 and rotating the outer sleeve 11 while holding the sleeve 18 against rotation by means of a wrench applied to the nut 19. Assuming that it is necessary to increase the flow of propellant fluid through the jet 25 and that the inner and outer threads of the sleeve 11 are right hand threads, the sleeve will be turned in a clockwise direction, thus causing said sleeve to move slightly to the right through the medium of the slow pitch thread 13 and to draw the inner sleeve 18 a greater distance through the medium of the quick pitch thread 12. When the desired adjustment is obtained, it suffices to tighten the lock nuts.

By means of this improvement the adjustment can be made while the device is in operation under actual working conditions whereby every factor bearing on the situation is in full effect, consequently the ultimate efficiency of operation can be obtained without possibility of error and the result can be obtained in very much less time than with other ejectors of this type which require to be removed from the line before adjustment can be made.

What I claim as my invention is:

1. An ejector having an annular propellant jet comprising a body having a bore and a propellant fluid chamber, an inner sleeve adapted for connection to a suction pipe and having a conical extremity at its inner end, said bore having a conical recess adapted to receive the conical extremity and define the annular jet, an outer sleeve having an inner thread engaging the inner sleeve and an outer thread engaging the body, said threads being of different pitch whereby rotation of the outer sleeve per se will move the inner sleeve relative to the body to vary the width of the annular jet.

2. An ejector having an annular propellant jet comprising a body having a globular chamber at one end and a bore extending to discharge therefrom, an inlet in communication with the chamber and extending radially thereinto, a sleeve adapted for attachment to a suction pipe extending concentrically through said chamber and defining with the bore the annular jet, the wall of said chamber being substantially in the form of an oval surrounding the axis of the sleeve with its minor axis in alignment with the axis of the inlet and its major axis vertical to the axis of the inlet to constrict the space between said sleeve and the body at a point diametrically opposite to the inlet to the chamber.

3. An ejector having an annular propellant jet comprising a body having a globular chamber at one end and a bore extending to discharge therefrom, an inlet in communication with the chamber and extending radially thereinto, a sleeve adapted for attachment to a suction pipe extending concentrically through said chamber and defining with the bore the annular jet, the wall of said chamber being of a configuration circumferentially about the axis of the sleeve to form a substantially oval contour wherein the inlet is directed along the minor axis of the oval, the side of chamber remote from the inlet and aligned with its longitudinal axis being constricted to impede the flow of eddy currents from one side of the sleeve to the other.

DAVID FREDERICK WINTERINGHAM.